United States Patent Office 2,803,623
Patented Aug. 20, 1957

2,803,623

TEMPERATURE CONTROL OF LOW TEMPERATURE EMULSION POLYMERIZATION

John W. Anderson, Jr., Borger, Tex., assignor to Phillips Petroleum Company, a corporation of Delaware No Drawing. Application October 29, 1951,
Serial No. 253,753

1 Claim. (Cl. 260—83.7)

This invention relates to the emulsion polymerization of aliphatic conjugated diene hydrocarbons. In one of its aspects the present invention relates to the controlling of temperatures in emulsion polymerization processes for producing high molecular weight polymers and especially synthetic rubber latices.

It is known that although the rate of polymerization can be increased by raising the polymerization temperature, the quality of the elastomer is improved at lower temperatures. Processibility, tensile strength, and elasticity are generally improved by carrying out the emulsion polymerization at low temperatures. However by proper selection of variables it is often possible to set up a system that will give as good a rubber at higher temperatures as some other polymerization system might give at lower temperatures. Of course, at higher temperatures the vapor pressure of the reacting mixture will be higher and, hence, a stronger reaction vessel will be required. In any case, the reaction temperature must be carefully controlled.

An object of this invention, therefore, is to provide a process whereby the temperature in emulsion polymerization reactions can be controlled. Another object of this invention is to provide a process for preventing drastic temperature rises during emulsion polymerization reactions. A further object of the instant invention is to produce more synthetic rubber latex which is on-specification. A still further object of this invention is to provide a conventional method for polymerizing aliphatic conjugated dienes within prescribed temperature ranges. Other objects will occur to those skilled in the art from the accompanying discussion and disclosure.

It is my novel discovery, upon which this invention is based, that there is a relationship between the rate of addition of short stopping agents to emulsion polymerization reactions and the reaction temperature at which the polymerization is carried out. Thus, by the addition of short stopping agents, particularly hydroquinone, excessive or drastic rises in the polymerization reaction temperature can be prevented. It was quite surprising to find that a short stop could be added during a polymerization run which continues after the addition and without adversely affecting the run. Since temperatures in emulsion polymerization processes are known to be difficult to control it is expected that the reaction temperature will rise two or three degrees. Therefore, by an excessive temperature rise I mean an increase in temperature of over two or three degrees. In accordance with the present invention, therefore, in the emulsion polymerization of aliphatic conjugated diene hydrocarbons reaction temperatures can be controlled by the addition of short stopping agents.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes. I prefer conjugated diolefins having from four to six carbon atoms, for example, 1,3-butadienes such as butadiene (1,3-butadiene), 2,3-dimethyl-1,2-butadiene, isoprene, piperylene, 3-furyl-1,3-butadiene, 3-methoxy-1,3-butadiene and the like. Other olefins are haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chloro styrene, p-methoxy-styrene, alpha-methylstyrene, vinyl-napthalene and similar derivatives thereof, and the like; acrylic and substituted acrylic acids and their esters, nitriles and amides such as acrylic acid, methacrylic acid, methy acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers. In addition high molecular weight polymers can be formed by the practice of this invention.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With those specific monomers, it is usually preferred to use them together, in relative ratios of butadiene to styrene between 65:35 and 90:10 by weight.

Hydroquinone is, of course, the most used short stopping agent. It has been found to give excellent results in the practice of my invention. However other well known short stopping agents can also be used, for example, pyrogallol, catechol, guaiacol, benzoquinone, alpha-naphthoquinone, tetraphenyl hydrazine, aniline, quinoline, nitrobenzene, benzyl mercaptan and butyl mercaptan.

It is emphasized that the amount of short stop to be employed cannot be set forth in general numerical terms. The quantity will vary in each particular instance with a number of variables such as the temperature of polymerization, the rate of temperature rise, the polymerization system including the particular monomers, modifiers, initiators and activators, and with each of the various short stopping agents. It can be stated generally that at low temperatures more short stopping agent will be required to prevent a temperature rise of a certain rate.

It is pointed out further that the amount of short stopping agent necessary to completely stop a given polymerization reaction is, of course, well known, and readily determined for any given system. Broadly the amount of short stopping agent required to stop an emulsion polymerization reaction is in the range of from about 0.02 or 0.05 part by weight to about 0.55 part by weight of short stopping agent based on 100 parts by weight of monomeric material.

It is understood that in view of the number of variables concerned data cannot be given to cover every operating procedure. Obviously it will be necessary to try small amounts of the short stopping agent in each particular case to prevent a given temperature rise. However, it will be known in each case that less than the amount to completely stop the reaction must be used, ordinarily less than from 0.2 to 0.55 part of short stopping agent by weight based on 100 parts by weight of monomeric material. If hydroquinone is employed as the short stopping agent the amount necessary to prevent a given temperature rise will always be less than 0.05 part by weight based on 100 parts by weight of monomeric material. Since the upper limit will be known in each case one skilled in the art can, without difficulty, determine in his emulsion polymerization system the amount required in any particular case, for any particular rate of temperature rise. Such procedures are well within the skill of the art once having been given the benefit of the present disclosure, and hence constitute no limitations on the present disclosure and invention. The example given hereinafter illustrates one procedure which has proved very valuable in the commercial production of synthetic rubber latices by emulsion polymerization. The short stopping agent used was hydroquinone. From the example it will be readily apparent that the present invention provides a desirable method for preventing excessive temperature rises in emulsion polymerization reactions by adding a short stop during polymerization in an amount sufficient to prevent a drastic rise in temperature but less than the amount required for short stopping the polymerization reaction.

The example following shows how the temperature of an emulsion polymerization system can be controlled for preparing synthetic rubber on a commercial basis where the reaction temperature must be kept within certain prescribed temperature specifications.

Example

In a plant where the process of my invention is used the polymerization occurs in a reaction vessel charged 90 percent full, provided with mechanical stirrers. The part of the reactor holding the charge is provided with a water jacket and cooled with a methanol-water solution that is at a temperature of from 0° F. to 10° F. The reaction starts at 41° F. and the rate of circulation of coolant through the jacket is regulated according to the temperature in the reactor. The reactor has a capacity for about 24,432 pounds of charging material. The recipe employed is as follows in parts by weight:

| | Parts by weight |
|---|---|
| Water | 200 |
| Butadiene-1,3 | 76 |
| Styrene | 24 |
| Dresinate-214 [1] | 4 |
| Tri-sodium phosphate .12H$_2$O | 0.25 |
| Tamol-n [2] | 0.15 |
| FeSO$_4$·7H$_2$O | 0.20 |
| Potassium pyrophosphate | 0.22 |
| Cumene hydroperoxide | 0.125 |
| KCl | 0.25 |

[1] Potassium soap of dehydrogenated (disproportionated) rosin.
[2] Sodium salt of a condensed aryl sulfonic acid.

To meet certain specifications, first, the reaction temperature cannot go over 48° F., and second, the reaction temperature cannot be over 43° F. for more than two hours. I found that when the following process was followed the number of batches of polymerized product which did not meet specifications was greatly reduced. In addition, by following process of this invention, it was possible to allow the reaction to run long enough so that each batch of product reached the desired conversion and viscosity. (In the practice of this invention (1) if the temperature of the reaction reached 46° F. in an hour or less from the start at 41° F. the reaction was considered fast and from .0162 part to .0216 part of hydroquinone by weight based on the total charge was added, dissolved in water to make a four per cent solution of hydroquinone in water. (2) If the temperature reached 46° F. after two hours or before 9 hours, .0108 part by weight of hydroquinone was added. If the temperature then reached 47° F. an additional amount of .0108 part by weight of hydroquinone was added based on the total charge. (3) If the temperature reached 46° F. after 9 hours then reaction was stopped when the temperature reached 48° F. However, if the temperature, after 9 hours, remained over 43° F. for more than two hours the reaction was stopped even though the temperature did not approach 48° F. since by specification the reaction temperature cannot remain over 43° F. for more than two hours. In stopping the polymerization reaction as I have just indicated, hydroquinone was, for convenience, used also as the short stopping agent. To short stop the reaction 0.15 part by weight based on 100 parts of monomeric material of the hydroquinone is used.

The above example illustrates the remarkable utility of my invention particularly since if the temperature of the reaction is over 43° F. for two hours the batch is off specification and must be blended back with nine good batches. If the temperature of the polymerization reaction reaches 48° F. the batch is off specification and must be blended with 19 good batches. Anther prior art procedure followed whenever a batch is about to exceed the temperature control limits is to pass the charge to the blowdown stage at a low conversion level. This, of course, results in reduced production. It is therefore readily seen that there is a great advantage in using the process of my invention.

The temperatures to which the process of the present invention is adaptable can vary over a wide range. For instance the polymerization can be carried out at temperatures in the range of from 0° F. to 117° F.

The process of this invention is not limited to any particular initiator-activator system, but, for example, can be employed effectively in hydroperoxide-iron complex systems, hydroperoxide-polyamine systems and in diazothioether systems. The amounts of activator and catalyst ingredients employed in each stage of the polymerization will vary depending upon the type and amounts of monomers used, and other reaction variables. Since a minor amount of monomeric material is used for the initial charge, usually less than 50 percent of the activator and catalyst ingredients are charged at this time.

It is generally preferred that the emulsion be of an "oil in water" type, with the ratio of aqueous medium to monomeric material between about 1.1:1 and about 2.75:1, in parts by weight. In fact water to monomer ratios can be as low as 0.15:1. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. When higher temperatures are employed, say up to about 50° C., some variations are usually introduced into the recipes. For example, in ferricyanide-diazo thioether-mercaptan recipes, the amount of ferricyanide is generally decreased as the temperature is increased.

The modifier in each recipe is preferably an alkyl mercaptan, and may be of primary, secondary, or tertiary configuration, and generally ranges from C$_8$ to C$_{16}$ compounds, but may have more or fewer carbon atoms per molecule. Mixtures or blends of these mercaptans are also frequently desirable and in many cases may be preferred to the pure compounds. The amount of modifier necessary to yield a polymer having an uncompounded Mooney viscosity within the desired range will vary depending, among other things, upon the particular recipe being used and upon the modifier (either pure mercaptan or a blend of several mercaptans) present in the recipe. The determination of the necessary amount of modifier in each case is within the skill of the art and is generally in the range of 0.2 part to 3 parts modifier per 100 parts by weight of monomers. In general, less modifier is needed to obtain the desired Mooney viscosity in the case of lower molecular weight mercaptans than with higher molecular weight mercaptans. Other modifying agents known to the art, for example, dialkyl dixanthogens, diaryl mono- and di-sulfides, tetra-alkyl thiuram mono- and di-sulfides, and mercaptothiazoles, can also be used to advantage in the process of my invention.

Emulsifying agents suitable for use in the practice of my invention include fatty acid soaps, e. g., potassium laurate, and potassium oleate, rosin acid soaps, and mixtures of fatty acid and rosin acid soaps. However other emulsifying agents, such as non-ionic emulsifying agents, salts of alkyl aromatic sulfonic acids, alkyl sulfates, and the like which produce favorable results under the conditions of the reaction, can also be used in practicing my invention, either alone or in admixture with soaps. The amount and kind of emulsifier used to obtain optimum results is somewhat dependent upon the particular recipe being used, the relative amounts of monomeric material and aqueous phase, and like variables. Usually an amount between about 0.3 and 5 parts per 100 parts by weight of butadiene will be found to be sufficient, determination of the best amount for any given recipe being within the skill of the art. Throughout this disclosure when "parts" are given, parts by weight based on 100 parts monomers are intended. When the amount is expressed in millimols per 100 parts of monomeric material the same units of weight throughout are used, i. e., when the monomeric material is in pounds the other material will be in millipound mols.

Suitable hydroperoxides for use in iron pyrophosphate (redox) and polyalkylene polyamine recipes and other recipes calling for an oxidant are preferably organic hydroperoxides having the formula RR'R"COOH wherein each of R, R', and R" is an organic radical, or R'R" together comprise a tetramethylene or pentamethylene group forming with

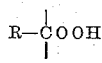

a cyclopentyl or cyclohexylhydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the forms of hydroxy and ether compounds, sulfur in similar compounds (i. e., mercapto compounds and thioethers), and halogen compounds. Examples of such hydroperoxides include diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl(ethoxyphenyl)hydroperoxymethane, methyldecyl-(methyl-phenyl)hydroperoxymethane, dimethyldecylhydroperoxymethane, methylchlorophenyl-phenylhydroperoxymethane, and tertiarybutylisopropylbenzene hydroperoxide (dimethyl(tertiary-butylphenyl)hydroperoxymethane).

Such hydroperoxides can be easily prepared by simple oxidation, with free oxygen, of the corresponding hydrocarbon or hydrocarbon derivatives, i. e., of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. The hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydropheroxide appears to be structurally possible. Thus, in a simple case, from such an oxidation of diisopropylbenzene the primary product appears to be dimethyl(isopropylphenyl)hydroperoxymethane.

One large group of these hydroperoxymethanes is that group in which each of the three substituent groups is a hydrocarbon radical. One of the sub-groups of these compounds is the alkaryldialkyl hydroperoxymethanes, in which the two alkyl groups are relatively short, i. e., have from one to three or four carbon atoms each, including dimethyl(tertiary-butylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl-(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4a,9,10,10a-octahydrophenanthrane, which forms the corresponding hydroperoxide upon oxidation, etc. The organic hydroperoxides preferably will have a total of not more than thirty carbon atoms per molecule, and the most active hydroperoxides usually have at least ten to twelve carbon atoms per molecule. Mixtures of these hydroperoxides can be used, as desired.

The amount of organic hydroperoxide used to obtain an optimum reaction rate will depend upon the polymerization recipe employed and upon the specific reaction conditions. The amount is generally expressed in millimols per 100 parts of monomers, using in each instance the same units of weight throughout, i. e., when the monomeric material is measured in pounds the hydroperoxide is measured in millipound mols. The same is true for other ingredients in the polymerization recipe. The optimum rate of polymerization is usually obtained with the amount of hydroperoxide between 0.01 and 10 millimols per 100 parts by weight of monomers.

The diazo thioethers of the present invention have the general structural formula R—N=N—S—R' wherein R is a member of the group consisting or aromatic and substituted aromatic radicals and R' is a member of the group consisting of aromatic, substituted aromatic, cycloalkyl, substituted cycloalkyl, aliphatic, and substituted aliphatic radicals. Desirable substituents are alkyl, chloro, nitro, methoxy, sulfo, and the like. Among preferred compounds are those more fully described in the patent to Reynolds and Cotton, U. S. Patent No. 2,501,692, granted March 28, 1950. These compounds act both as initiators and as modifiers in a polymerization recipe and hence may be used as both catalysts and modifiers in the recipe. However it is preferred to use a modifier of the type noted above along with the diazothioether in the practice of our invention. In certain instances, it may also be desirable to use a catalyst such as potassium or sodium ferricyanide in conjunction with the diazothioether. Examples of suitable diazothioethers include 2-(2,4-dimethylbenzenediazomercapto)-naphthalene, 2-(4-methoxybenzenediazomercapto)naphthalene (known in the art as MDN), 2-(2-methylbenzenediazomercapto)naphthalene, 2 - (2,5-dimethoxybenzenediazomercapto)naphthalene, 4 - (2,5-dimethoxybenzenediazomercapto)toluene, 4 - (2-naphthalenediazomercapto)anisole, 2-(4-acetylaminobenzenediazomercapto)-naphthalene, 2-(benzenediazomercapto)naphthalene, 2-(4-sulfobenzenediazomercapto)benzothiazole, 2-(1-naphthalenediazomercapto)naphthalene, 2-(4-chlorobenzenediazomercapto)naphthalene, 2-(5-quinolinediazomercapto)naphthalene, 2-(4-nitrobenzenediazomercapto)naphthalene, and the like.

The type and amount of diazothioether used in a particular polymerization recipe depends upon the result desired. In general, approximately 0.2 part by weight of diazothioether per 100 parts of butadiene will give satisfactory promotion of the polymerization reaction although other proportions within the range of about 0.5 to about 5.0 parts by weight per 100 parts by weight of monomers, can be used. The diazothioether can be added in increments throughout the polymerization reaction in order to provide more uniform modification and to obtain more efficient utilization of the diazothioether. If the diazothioether is used alone to modify the polymer, somewhat larger quantities are needed than is the case if other modifiers are used in conjunction therewith.

In the case of an iron pyrophosphate (redox) recipe, the presence of a sugar or similar reducing agent is optional. Suitable reducing agents (also known as activating agents) include fructose, dextrose, sucrose, benzoin, acetyl-acetone, ascorbic acid, sorbitol, benzaldehyde, and the like.

When a ferrous pyrophosphate activator is used in an iron pyrophosphate (redox) recipe, it is preferably prepared by admixing a ferrous salt, such as ferrous sulfate, with a pyrophosphate of an alkali metal, such as sodium or potassium, with water and heating this mixture, preferably for the length of time required for maximum activity. A reaction occurs between the salts, as evidenced by the formation of a grayish-green precipitate. When preparing the activator the mixture is generally heated above 122° F., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 140° F. for a period of heating ranging from 10 to 30 minutes. Prior to heating the acivator mixture the vessel is usually flushed with an inert gas such as nitrogen. In general it is preferred to heat the mixture below the boiling point, say at a temperature around 130° to 165° F.

Where the activator is prepared just prior to use it is generally employed in the form of an aqueous dispersion. Since activators and initiators are added in two stages two portions of the activator in aqueous dispersion will be used. However, the solid acivator may be isolated and the crystalline product used, and it is preferred in this form in some instances. Subsequent to heating the activator mixture, it is cooled to about room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the monomers. This crystalline material is believed to be a sodium ferrous pyrophosphate complex, such as might be exemplified by the formula $2Na_2FeP_2O_7 \cdot Na_2P_2O_7$, or perhaps $Na_2FeP_2O_7$. In any event the complex, whatever its composition, is one active form of ferrous iron and pyrophosphate which can be successfully used in our invention. It can be incorporated in the polymerization mixture as such, or can be dispersed in water. Other forms of multivalent metal, e. g., copper, and pyrophosphate may also be used, so long as there is present in the reacting mixture a soluble form of a multivalent metal, capable of existing in two valence states and present primarily in the lower of two valence states, and a pyrophosphate.

The amounts of activator ingredients to be charged in an iron pyrophosphate recipe are usually expressed in terms of monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however the narrower range of 0.2 to 2.5 millimols is more frequently preferred. The mol ratio of ferrous salt to alkali metal pyrophosphate can be between 1 to 0.2 and 1 to 3.5 with a preferred ratio between 1 to 0.35 and 1 to 2.8.

In the case of a polyalkylene polyamine recipe, the activating agent, i. e., a polyalkylene polyamine is preferably a polyethylene polyamine or a trimethylene polyamine. Suitable polyethylene polyamines have the general formula $RNH(CHXCHXNH)_m(CHXCHX)_nNHR$, where R contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Example of such polyamines include ethylenediamine, hydrazine, diethylenetriamine, tetraethylenepentamine, dipropylenetriamine, 2-methyl-3-azapentane-1,5-diamine, N - (2-hydroxy-ethyl)-1,2-ethanediamine, N - phenylethylenediamine, N - cyclohexyl-N'-(2-aminoethyl)-1,2-ethanediamine, N - (2 - hydroxy-tertiary-butyl)-1,2 - propylenediamine, carbamates of the foregoing and the like.

Suitable trimethylene polyamines are preferably those having the general formula

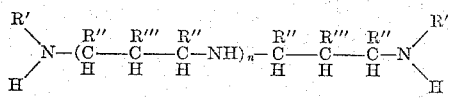

where each R' is one of the group consisting of hydrogen, methyl, ethyl, hydroxy-methyl, hydroxyethyl, and carboxy radicals, each R'' is hydrogen or methyl, and each R''' is hydrogen, methyl, or an activating substituent of the group consisting of —OR, —SR, —NR₂, —CN, —SCN, —COOR, —CHO, with R being hydrogen methyl, ethyl n-propyl, or isopropyl, or —CHR''' can be >C=O, and n is an integer between 0 and 8 inclusive. The compounds containing a single trimethylene group together with its two terminal amine groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compound, can also be employed; for example tri-(trimethylene)tetramine (sometimes erroneously designated as tripropylenetetramine) is considered to be a polymer of trimethylenediamine. All of the polyamine compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines." It is preferred to use only those polyamines which come within the structural formula defined hereinabove, and all of the compounds so defined are operable in my process to some extent though it will of course be appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example the following are mentioned:

1,3-diaminopropane, 1,3-diaminoacetone, 1,3-diamino-2-propanol, N,N'-dimethyl-1,3-diaminoacetone, N-ethoxy-1,3 - diamino-2-propanol, 1,3-diamino-2-carboxypropane, 1,3-diamino-2-(dimethyl-amino)-propane, 2,4 - diaminopentane, 1,3-diamino-2-cyanopropane, 1,3 - diamino - 2-mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the monomers, except as such compounds may fortuitously be present as traces in the polymerization mixture. Similarly, no other reducing ingredient, such as a reducing sugar, need be added.

The amount of polyalkylene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of monomers will give satisfactory results; however greater or smaller amounts of polyamine can be used.

From the foregoing disclosure it is clear that I have provided a useful process for use in emulsion polymerization reactions. Variations will, of course, occur to those skilled in the art. However such modifications as are within the skill of the art are within the scope of the instant invention.

I claim:

In a process for the emulsion polymerization of butadiene and styrene wherein the reaction begins at a temperature about 41° F. and the reaction product is off-specification if the temperature during the reaction exceeds 46° F., the improvement comprising continuously determining the temperature of reaction, permitting the reaction to proceed so long as the temperature does not exceed 46° F., and adding a polymerization inhibitor to said reaction when its temperature exceeds 46° F., the amount of said addition being sufficient to effect prompt reduction of temperature but insufficient to shortstop the reaction, whereby the reaction temperature is accurately controlled to produce an on-specification product.

References Cited in the file of this patent

Kluchesky et al.: Ind. & Eng. Chem., volume 41, No. 8, August 1949, pages 1768–1770.